F. S. YOUNG.
PROCESS OF MANUFACTURING MAGNESIUM CARBONATE.
APPLICATION FILED OCT. 6, 1909.
1,034,330.
Patented July 30, 1912.
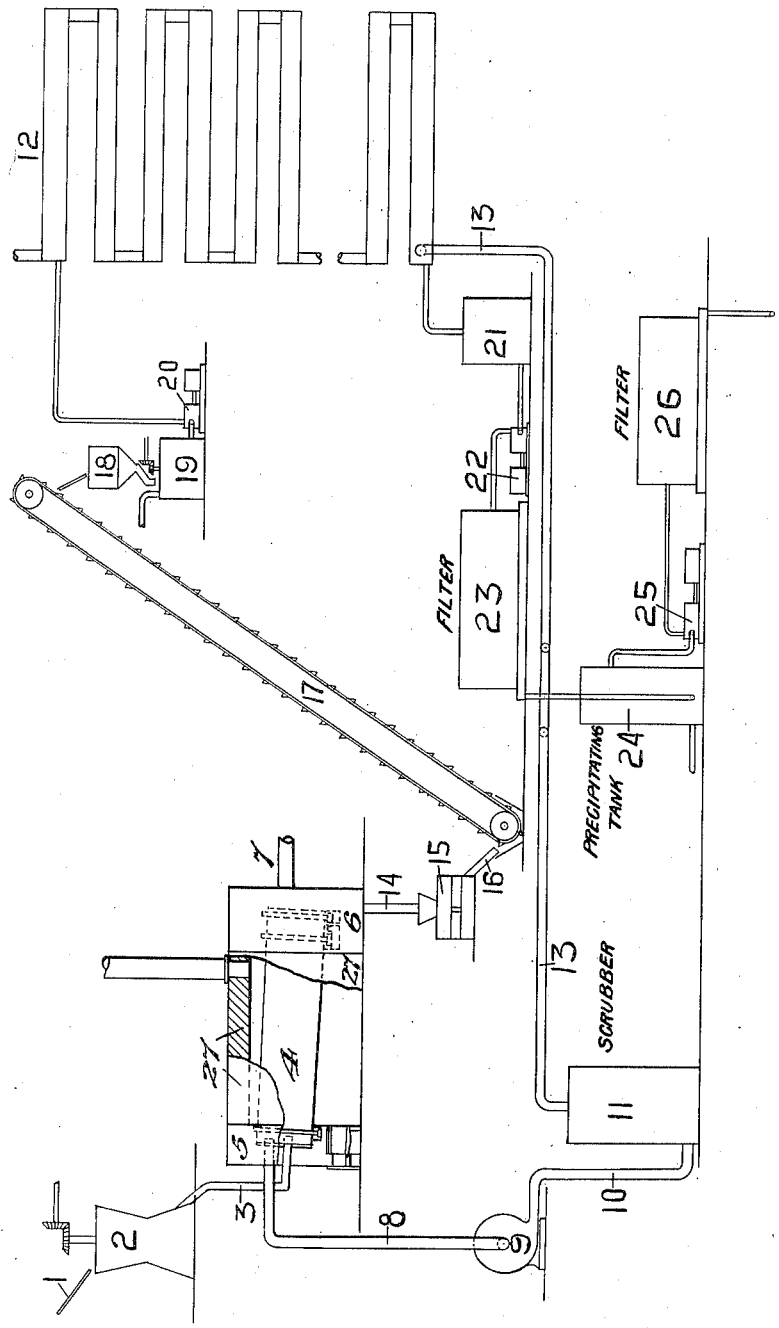

UNITED STATES PATENT OFFICE.

FRANK S. YOUNG, OF NEWARK, NEW JERSEY.

PROCESS OF MANUFACTURING MAGNESIUM CARBONATE.

1,034,330.            Specification of Letters Patent.    Patented July 30, 1912.

Application filed October 6, 1909. Serial No. 521,382.

*To all whom it may concern:*

Be it known that I, FRANK S. YOUNG, a citizen of the United States, and resident of Newark, in the county of Essex and State of New Jersey, have invented certain new and useful Improvements in Processes for Manufacturing Magnesium Carbonate, of which the following is a specification.

This invention relates to processes for manufacturing magnesium carbonate from dolomitic limestones and particularly to such processes in which the separation of the magnesium from the calcium of the dolomitic limestone is performed by converting the former into a soluble bicarbonate.

The object of my invention is to provide an improvement in such processes whereby the cost of manufacture may be lessened and output for a given investment in plant increased.

In the process of manufacture, at present in use, the dolomite is burned to quicklime, the latter slaked and made into a "milk" of lime, and the said "milk" subjected to the action of carbonic acid gas under comparatively high pressure. The carbonic acid gas used for this purpose is that produced in the kiln in which the dolomite is burned. Part of the $CO_2$ combines with the calcium to form the normal carbonate $CaCO_3$, which being insoluble in water, remains in suspension in the solution. The magnesium oxid of the milk of lime, is first converted into magnesium carbonate. This carbonate takes up an additional molecule of $CO_2$ to form a soluble carbonate. This soluble carbonate is generally regarded as having the formula $H_2Mg(CO_2)_2$ or that of a bicarbonate. The bicarbonate dissolves in the water present while, as stated, the calcium remains in suspension as the carbonate. By filtering the solution a clear solution of magnesium bicarbonate is obtained, which if boiled, throws down its magnesium as a basic carbonate. The composition of this carbonate varies with the temperature of precipitation, concentration of the solution, duration of the boiling, etc. By filtering the boiled liquid this basic carbonate is separated and then dried.

The calcium carbonate separated as mentioned above contains practically all the impurities of the milk of lime—such as the silica, iron and alumina. It is therefore useless for most of the purposes to which precipitated calcium carbonate or precipitated chalk can be put and is in consequence practically a waste product. The expense of dissociating the calcium carbonate originally present in the stone and reconverting the calcium oxid into carbonate is therefore wholly wasted. Now by the herein revealed invention I entirely avoid this loss and so carry out my treatment of the dolomite that I incur no loss for unnecessary and superfluous steps.

In my improved process, I first crush the dolomite rock to such a size that it will pass through a screen of about ¼ inch mesh. The crushed rock is next passed through a rotary cylinder where it is subjected to a heat of about 900°–1000° Fah. This heating effects a partial decomposition of the dolomite, the water, organic matter, etc., and part of the $CO_2$ combined with the magnesium being driven off. The heating also seems to oxidize any iron present and thus render it insoluble in the further treatment.

In heating the dolomite I may, of course, use a direct flame, the hot gases from a separate furnace, the hot gases from limekilns or any other method of heating that is convenient. The method which I prefer is to take the gases from a lime kiln or a number of kilns at a temperature sufficiently high to furnish the quantity of heat required and conduct them through the rotating cylinder in a direction of travel opposite to that of the crushed dolomite. By this means, I not only recover from the kiln gases a larger proportion of their sensible heat than is practicable in the limekilns themselves, but at the same time enrich them in $CO_2$ to a considerable extent. When the kiln gases have not a sufficiently high temperature to effect the heating of the dolomite (which is nearly always the case in good practice) I heat the cylinder externally by building a suitable chamber about it and subjecting it to the heat of the hot gases from a suitable firebox. The partial calcination of the dolomite, in addition to destroying the organic matter and rendering the iron insoluble, so to speak, "quickens" the dolomite and renders its magnesia chemically active. The partially calcined dolomite is now finely ground, and mixed with water. This "milk" is next subjected to carbonation.

The carbonating of the "milk" is not necessarily different from that step in the process at present in use. I prefer however to carry out the carbonation at low pressures near that of the atmosphere, in order to avoid the expense of highly compressing the kiln gases as is done in the present methods of manufacture. In my preferred method of carbonating, I run the dolomite "milk" (i. e. the partially calcined and finely ground dolomite suspended in water) in a shallow layer through a long trough or conduit, the $CO_2$ bearing gases passing in the opposite direction through the conduit in contact with the surface of the stream of dolomite milk. In the preferred method the gas rich in $CO_2$ obtained by passing lime-kiln gases through the calcining cylinder, is passed through scrubbing towers of any suitable design, where it is cooled and all tarry matter and dust removed. The scrubbed gas is next forced through the long conduit where it contacts with the stream of dolomite "milk." As a matter of convenience I prefer to divide the conduit into a number of sections of convenient length and superimpose these sections one above the other, the sections being connected so as to form a continuous conduit.

The temperature to which the dolomite is exposed in calcination is not sufficient to decompose the calcium carbonate. The suspended matter in the dolomite "milk," therefore, consists of carbonate of calcium, oxid of magnesium, carbonate of magnesium and whatever $SiO_2$, $Fe_2O_3$ and $Al_2O_3$ may be present as impurities. The calcium carbonate present is unaffected by the carbonation. The oxid of magnesia takes up $CO_2$ to form $MgCO_3$. This artificially formed $MgCO_3$, as well as any undecomposed $MgCO_3$ from the original dolomite, takes up another molecule of $CO_2$ to form $MgH_2(CO_3)_2$ which goes into solution.

The above is the generally accepted theory of the solution of the magnesia, although there is some reason to believe that, in reality, it is simply a solution of the normal carbonate in water impregnated with $CO_2$. I do not, therefore, restrict myself to the above given theory of solution, but simply give it as a probable explanation of the fact. The liquid from the carbonators is next pumped through filter presses where all suspended matter is removed. The clear solution of magnesium carbonate is next conducted to the precipitation tanks. Here live steam is blown into the solution raising the temperature to about 205° Fah. This heating drives off the major portion of the $CO_2$ which is held by the solution and causes the formation of a basic carbonate of magnesium which is insoluble and precipitates. The precipitated carbonate is separated from the water in which it is suspended by filtration. The wet carbonate is next taken from the filters and dried. The temperature to which the carbonate is exposed in drying, generally, does not exceed 175° Fah.

The carbonate when dried at this temperature has about the following composition, to wit:—

$MgO$ -------------------- 40.3
$CO_2$ -------------------- 35.5
$H_2O$ -------------------- 24.2

The impurities usually do not exceed from 1/10 to 15/100 of 1%.

If we regard all the water as existing either as basic water or water of crystallization, the composition of the carbonate may be represented thus, $$(MgCO_3)_{80}(MgO_2H_2)_{20}.113H_2O.$$

By varying the temperature of precipitation, duration of boiling, etc., the composition of the carbonate may be greatly varied.

In the accompanying drawing I have shown, diagrammatically, an arrangement of apparatus in which my process may be carried out.

The dolomite is discharged by chute 1 into crusher 2. From the crusher it passed through chute 3 to the rotary calciner 4. This works in suitable housings, 5 and 6. The hot calcining gases enter the housing 6 through the flue 7 and after passing through the calciner discharge from housing 5 through the flue 8. 8 is connected with the suction pipe of blower 9, whose discharge pipe, 10, is connected with a scrubber 11. After passing through the scrubber the gas passes to the carbonating apparatus 12 through the flue 13. The crushed dolomite passes through the calciner 4 and discharges through a closed conveyer 14 to a suitable mill 15, where it is ground to about 80 mesh. From 15 the ground material discharges over the chute 16 to an elevator 17 which raises it to the hopper 18. From 18 the material discharges into a mixing tank 19 where it is mixed with the proper proportion of water. This may be varied according to conditions, but I prefer to use about 800 gal. of water for every 100 lb. of the powdered material. The dolomite milk is pumped by the pump 20 to the top of the carbonating apparatus 12. Flowing through 12 the milk absorbs carbon dioxid from the current of gas passing in the opposite direction, the magnesium carbonate formed going into solution. The carbonated milk collects in tank 21 and is pumped by pump 22 to a suitable filtering apparatus 23. Here the magnesia solution is separated from the insoluble calcium carbonate and impurities of the dolomite and flows to the boiling tank 24, where the magnesium carbonate is precipitated. The boiled solution is next pumped by pump 25 to the filtering apparatus 26, where it is separated from the surplus water, after which it is ready for drying.

Having described my invention what I claim is:—

1. The process of manufacturing magnesium carbonate which comprises crushing dolomitic limestone, heating the crushed stone to a temperature such that a portion of its magnesium carbonate is dissociated but substantially all of its calcium carbonate remains undissociated, grinding the so heated stone, and dissolving out the magnesium compounds from the heated and ground stone by treating said stone with carbon dioxid in the presence of water until the major portion of the magnesium has been converted into bicarbonate.

2. The process of manufacturing magnesium carbonate which comprises crushing dolomitic limestone, heating the crushed stone to a temperature such that a portion of its magnesium carbonate is dissociated but substantially all of its calcium carbonate remains undissociated, grinding the so-heated stone, dissolving out the magnesium carbonate from the heated and ground stone by treating said stone with carbon dioxid in the presence of water until the major portion of the magnesium has been converted into bicarbonate, and boiling the bicarbonate of magnesium solution so obtained, whereby the magnesium is precipitated as basic carbonate, substantially as described.

3. The process of manufacturing magnesium carbonate which comprises crushing dolomitic limestone, partially calcining the said crushed limestone at a temperature sufficiently high to substantially dehydrate the said limestone, and to cause the dissociation of the major portion of the magnesium carbonate of said limestone but sufficiently low to leave substantially all of the calcium carbonate of said limestone undissociated, grinding said partially calcined dolomitic limestone to powder, dissolving out the magnesium compounds by treating the said partially calcined and powdered dolomitic limestone with carbon dioxid in the presence of water at substantially atmospheric pressure whereby the major portion of the magnesium of said dolomitic limestone is obtained in solution, separating the said solution from the undissolved residue, heating said solution of magnesium carbonate whereby the magnesium of said solution is precipitated as a basic carbonate, and recovering the said precipitated carbonate, substantially as described.

Signed at New York in the county of New York and State of New York this 5th day of October A. D. 1909.

FRANK S. YOUNG.

Witnesses:
  Louis F. Musil,
  W. J. Quentin.